(12) United States Patent
Ebeid et al.

(10) Patent No.: US 8,712,039 B2
(45) Date of Patent: Apr. 29, 2014

(54) EFFICIENT IMPLEMENTATION OF HASH ALGORITHM ON A PROCESSOR

(75) Inventors: Nevine Maurice Nassif Ebeid, Kitchener (CA); Robert John Lambert, Cambridge (CA)

(73) Assignee: Certicom Corp., Mississauga (CA)

( * ) Notice: Subject to any disclaimer, the term of this patent is extended or adjusted under 35 U.S.C. 154(b) by 58 days.

(21) Appl. No.: 13/440,264

(22) Filed: Apr. 5, 2012

(65) Prior Publication Data

US 2012/0257742 A1   Oct. 11, 2012

Related U.S. Application Data

(60) Provisional application No. 61/472,422, filed on Apr. 6, 2011.

(51) Int. Cl.
*H04L 1/00* (2006.01)
(52) U.S. Cl.
USPC ............. 380/28; 380/256; 713/168; 713/176; 713/181; 713/190
(58) Field of Classification Search
USPC .......................................................... 380/28
See application file for complete search history.

(56) References Cited

U.S. PATENT DOCUMENTS

| 5,297,038 | A * | 3/1994 | Saito | 1/1 |
| 7,299,355 | B2 * | 11/2007 | Qi | 713/168 |
| 2004/0260740 | A1 | 12/2004 | Liu | |
| 2005/0050396 | A1 * | 3/2005 | Thomborson et al. | 714/38 |
| 2005/0114653 | A1 * | 5/2005 | Sudia | 713/158 |
| 2007/0174596 | A1 * | 7/2007 | Matsuo | 712/226 |
| 2010/0046755 | A1 * | 2/2010 | Fiske | 380/256 |
| 2010/0049986 | A1 * | 2/2010 | Watanabe et al. | 713/181 |
| 2010/0086127 | A1 | 4/2010 | Grinchuk et al. | |
| 2010/0250966 | A1 * | 9/2010 | Olson et al. | 713/190 |
| 2011/0231636 | A1 * | 9/2011 | Olson et al. | 712/222 |
| 2012/0144203 | A1 * | 6/2012 | Albisu | 713/184 |
| 2013/0108038 | A1 * | 5/2013 | Ciet et al. | 380/28 |

OTHER PUBLICATIONS

"Cryptanalysis of EnRUPT." Dmitry Khovratovich, Ivica Nikolic, IACR Cryptology ePrint Archive Jan. 2008; 2008:467.*

"High-Speed Hardware Architectures of the Whirlpool Hash Function" Máire McLoone, Ciaran McIvor, Aidan Savage Institute of Electronics, Communications and Information Technology, Queen's University Belfast, Northern Ireland maire.mcloone@ee.qub.ac.uk, c.mcivor@ee.qub.ac.uk, 2005.*

"FPGA Implementation of MD5 Hash Algorithm" J. Deepakumara, HA4. Heys, and R. Venkatesan, "FPGA Implementation of MD5 Hash Algorithm", Proceedings of CCECE 2001, Toronto, Ontario, 2001.*

(Continued)

*Primary Examiner* — Linglan Edwards
*Assistant Examiner* — Gary Gracia
(74) *Attorney, Agent, or Firm* — Oblon, Spivak, McClelland, Maier & Neustadt, L.L.P.

(57) ABSTRACT

An efficient implementation of SHA-512, and similarly SHA-384, on an ARM processor. The implementation maximizes reuse of the register values between iterations so as to minimize the need to load these values from memory. This is achieved by categorizing the iterations into even and odd ones such that the sequence of computation in the even iteration is reversed in the odd iteration and the register values at the end of one iteration are consumed at the beginning of the following one.

21 Claims, 3 Drawing Sheets

(56) References Cited

OTHER PUBLICATIONS

"Hardware Implementation of the Salsa20 and Phelix Stream Ciphers" Junjie Yan and Howard M. Heys Electrical and Computer Engineering Memorial University of Newfoundland Email: {junjie, howard}@engr.mun.ca, 2007.*

International Search Report and Written Opinion for PCT Application No. PCT/CA2012/050219, mailed May 25, 2012.

* cited by examiner

EFFICIENT IMPLEMENTATION OF HASH ALGORITHM ON A PROCESSOR

CROSS-REFERENCE TO RELATED APPLICATION

This application claims the benefit under 35 U.S.C. §119(e) of U.S. Provisional Application No. 61/472,422, filed Apr. 6, 2011, entitled "Efficient Implementation of Hash Algorithm on a Processor." U.S. Provisional Application No. 61/472,422 includes exemplary systems and methods and is incorporated by reference in its entirety.

BACKGROUND OF THE INVENTION

1. Field of the Invention

The present invention is directed in general to communications systems and methods for operating same, and more particularly to efficient implementation of a hash algorithm on a processor.

2. Description of the Related Art

In known wireless telecommunications systems, transmission equipment in a base station or access device transmits signals throughout a geographical region known as a cell. As technology has evolved, more advanced equipment has been introduced that can provide services that were not possible previously. This advanced equipment might include, for example, an E-UTRAN (evolved universal terrestrial radio access network) node B (eNB), a base station or other systems and devices. Such advanced or next generation equipment is often referred to as long-term evolution (LTE) equipment, and a packet-based network that uses such equipment is often referred to as an evolved packet system (EPS). An access device is any component, such as a traditional base station or an LTE eNB (Evolved Node B), that can provide a communication device, such as user equipment (UE) or mobile equipment (ME), with access to other components in a telecommunications system.

One issue that is present in many UE type devices relates to providing security such as via a hash algorithm. SHA-512 is a Hash algorithm from the second generation secure hash algorithm (SHA-2) family (see e.g., the FIPS180-3 hashing standard). It includes 80 rounds of repeated operations on a state consisting of eight 64-bit words. The implementation of SHA-512 on an advanced reduced instruction set computer (risc) machine type ARM processor, such as the ARMv5t architecture, is a challenging task since it comprises sixteen 32-bit registers of which one is the program counter (PC) and the other is the stack pointer (SP). Hence, the SHA-512 state cannot be entirely kept in the 14 working registers, only portions of it at a time would be loaded into them and undergo the necessary calculations before being stored back on the stack. The challenge lies in optimizing the registers utilization and minimizing the relatively lengthy load operations.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
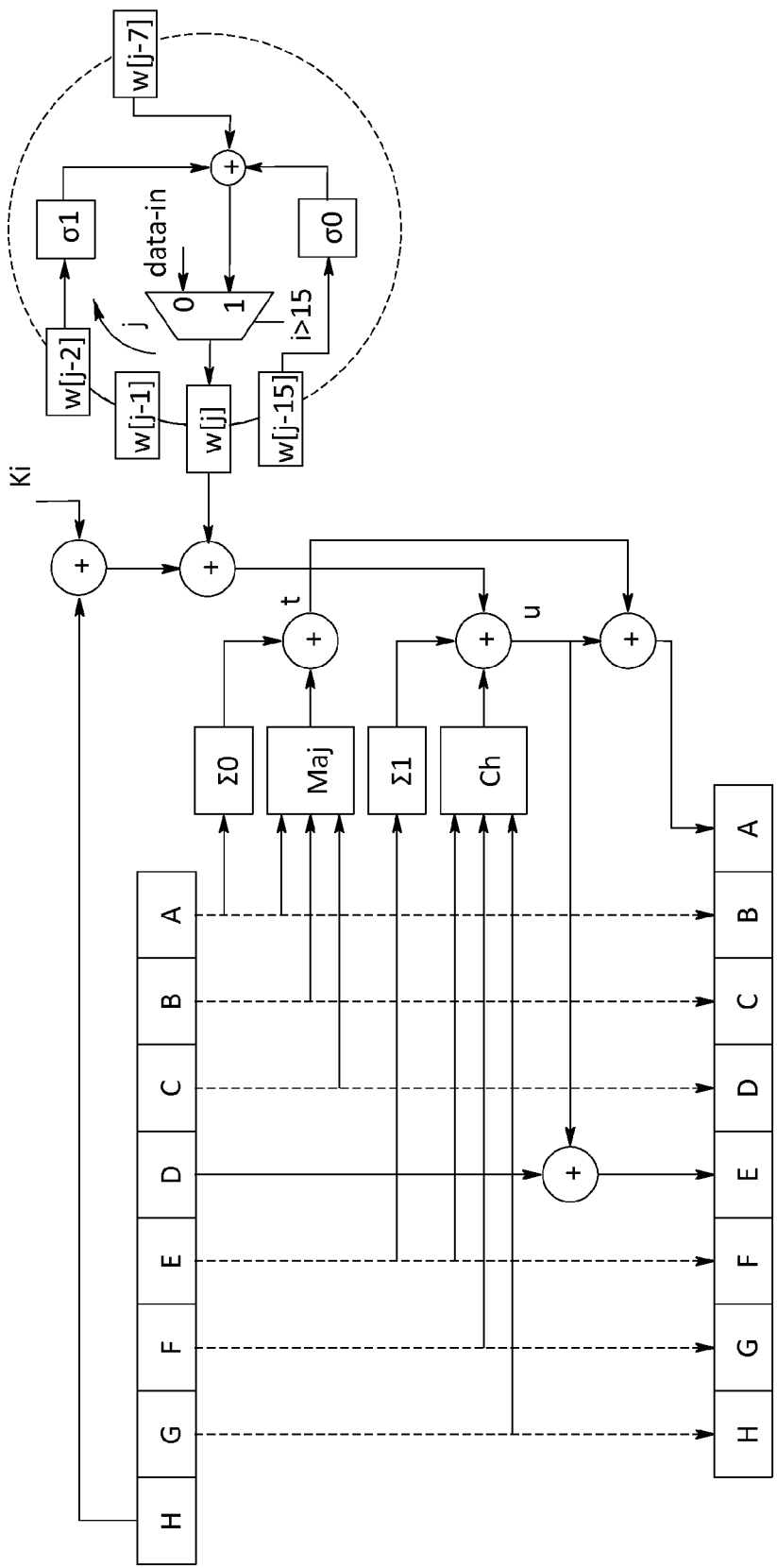
FIG. 1 shows a block diagram of a flow of computation in a hash algorithm.

A method, system and computer-usable medium are provided for maximizing the number of registers at the end of an iteration that contain values to be used at the beginning of the following iteration. This is achieved by categorizing the SHA-512 algorithm iterations into even and odd iterations, where the sequence of computation in the even iteration is reversed in the odd iteration. Hence an even and an odd iteration form together a new iteration of the loop. Furthermore, the capabilities of some more advanced architectures such as the ARMv5te are leveraged, including data preloading and doubleword loading/storing by carefully assigning the state words to the registers.

More specifically, in certain embodiments, the present invention includes categorizing, and unrolling iterations of SHA-512, and similarly SHA-384, into even and odd iterations, where the sequence of computation in the even iteration is reversed in the odd iteration. Hence an even and an odd iteration form together a new iteration of the loop. Additionally, in certain embodiments, some of the state words that are readily found in registers at the end of one iteration are reused at the beginning of the following iteration. Additionally, in certain embodiments, in the last 64 iterations, the offset is kept constant between the location of the current 8 state words and the pointer to the current w word, which is one of the 16 w words where the input block was originally copied in the stack and are constantly being updated. Additionally, in certain embodiment, each 16 iterations are grouped together and are governed by a counter which stores the index of the current w and is used to determine the locations of the other w words and to check for loop termination. Additionally, in certain embodiments, register pairs R (d), R (d+1) are assigned to the algorithm 64-bit words when loading/storing them, where d is even and not equal to 14, in order to leverage load/store doubleword instructions if available on the target processor.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flowchart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Referring now to FIG. 1, a block diagram of a flow of computation in a hash algorithm is shown. More specifically, the computation performed per iteration of the SHA-2 family of hash algorithms is shown. In certain embodiments, a word is 64 bits long unless otherwise stated, while the processor registers are 32 bits long.

In SHA-512, as well as SHA-384 which is a truncated version of SHA-512, the state of every iteration includes eight 64-bit words A to H. The block to be hashed includes sixteen 64-bit words that are input to the algorithm through data-in during the first 16 iterations and stored in sequence in an array w. In the remaining 64 iterations, the function illustrated is calculated on 4 w words, w[j], w[j−2], w[j−7] and w[j−15], and the result is used to update w[j] and contributes to the new state values A and E. Other contributing values to A and E are the 64-bit words Ki which are specified by the algorithm for each iteration i of the 80 iterations and the output of the functions $\Sigma 0$, Maj, $\Sigma 1$ and Ch that operate on the previous state value. Apart from A and E, the other new state values are a shifted copy from the previous state (i.e., old A becomes B, B becomes C, etc.). In the actual implementation, these values are not copied, but are stored on the stack, where adequate space is allocated to store the new A ahead of the old A, as shown in FIG. 1. A pointer is advanced in each iteration.

Apart from the first iteration where the state values are initialized with zeros or the hash output of a previous run of the algorithm, the store instructions are only needed for w[j], A and E. Therefore, these values are updated in FIG. 1 via solid arrows, while the other values are "updated" (renamed) with dashed arrows. This classical description is summarized in Pseudocode 1.

Pseudocode 1. Pseudocode of SHA-2 iterations

```
1.  For i from 0 to 15 do:
    1.1    w[i] = the next 8 bytes of the input
    1.2    H += Ki
    1.3    H += w[i]
    1.4    H += Σ1 (E)
    1.5    H += Ch (E, F, G)
    1.6    D += H
    1.7    Store D
    1.8    H += Σ0 (A)
    1.9    H += Maj (A, B, C)
    1.10   Store H ahead of A, where it becomes the new A.
    1.11   Update the stack pointer; all values get renamed.
2.  For i from 16 to 79 do:
    2.1    j = i mod 16
    2.2    w[j] += σ1 (w[(j − 2) mod 16])
    2.3    w[j] += w[(j − 7) mod 16]
    2.4    w[j] += σ0 (w[(j − 15) mod 16])
    2.5    Repeat steps 1.2 to 1.11
```

However, all the values A-H, Ki and the ws require load operations from the stack into the registers to undergo the specified functions. The present embodiment minimizes the number of load instructions required in every iteration by reusing values from the previous iteration that are still in the registers. This is achieved by categorizing, and unrolling, the algorithm iterations into even and odd ones, where the sequence of computation in the even iteration is reversed in the following odd iteration as explained in the following and summarized in Pseudocode 2.

Pseudocode 2. Pseudocode of the new implementation

```
1.  i = 0
2.  do:
    2.1    t = Σ0 (A) + Maj (A, B, C)
    2.2    w[i] = the next 8 bytes of the input
    2.3    H += w[i]
    2.4    H += Ki
    2.5    H += Σ1 (E)
    2.6    H += Ch (E, F, G)
    2.7    D += H
    2.8    Store D
    2.9    H + = t
    2.10   Store H ahead of A, where it becomes the new A.
    2.11   Update the stack pointer; all values get renamed.
    2.12   i += 1        // When each of Ki and w[i] are loaded,
                         their respective pointers are
                         // updated; there is not actual register
                         containing i to be incremented.
    2.13   (The values E − H, A are in registers, no need to load
           them)
    2.14   H += Ch (E, F, G)
    2.15   H += Σ1 (E)
    2.16   w[i] = the next 8 bytes of the input
    2.17   H += w[i]
    2.18   H += Ki
    2.19   D += H
    2.20   Store D
    2.21   H += Σ0 (A)
    2.22   H += Maj (A, B, C)
    2.23   Store H ahead of A, where it becomes the new A.
    2.24   Update the stack pointer; all values get renamed.
    2.25   i += 1 // The pointers to Ki and w[i] are actually
           updated when they are loaded
    2.26   (The values A − C are in registers, no need to load
           them)
    while Ki ≠ K15 // 8 iterations
3.  For i from        // this loop is unrolled into 4 loops, each
    16 to 79 do:      8 new even-and-odd iterations,
                      // where the offset between the stack
                      pointer and w[0] is constant
    3.1    t = Σ0 (A) + Maj (A, B, C)
    3.2    j = i mod 16   // a register is used to store j and is
                          reset every 16 iterations.
                          // Using the constant offset and j, the
                          location of w[j] is determined.
    3.3    w[j] += σ1 (w[(j − 2) mod 16])
    3.4    w[j] += w[(j − 7) mod 16]
    3.5    w[j] += σ0 (w[(j − 15) mod 16])
    3.6    H += w[j]
    3.7    Repeat steps 2.4 to 2.15
    3.8    Repeat steps 3.2 to 3.6
    3.9    Repeat steps 2.18 to 2.25
    3.10   (The values A − C and w[j + 1] are in registers, no need
           to load them)
```

In the first iteration, i=0, the words A-C are loaded first, the value t in FIG. 1 is computed and stored in a pair of registers. Then, the remaining words D-H are loaded, the value u is computed, the new value E calculated and stored as well as the new value A after that. At the end of this even iteration, the values found in registers are E-H and A according to their updated names. These values are directly used in the following odd iteration, i=1, to calculate u first and update the new E. B-D are then loaded, t is calculated and the new A is updated. Now at the end of this odd iteration, the values H, A and B which become A-C are readily available in registers to be consumed at the beginning of the following even iteration in the same way as in the iteration i=0. Hence, an even iteration followed by an odd iteration form a single new iteration of the loop. The average number of words A-H loaded per original iteration in our new implementation is four (eight 32-bit loads), instead of eight (sixteen 32-bit loads) in the classical implementation.

In each of the first 16 iterations, a new Ki is loaded and a new w is formed by loading eight bytes of the input data one byte at a time into registers. This occurs in the middle of the iteration when registers become available after the values u or t are computed, in order not to interfere with the register re-usage at the beginning and the end of the iterations. Also, since the Ki values, and possibly the addresses, are constant and are hard-coded, the end condition of the loop of those first 16 iterations may be the check against the address or the value of K15; which requires preserving one of the two registers of Ki till the end of the odd iteration. Therefore, in these iterations, there is no register used as a counter i; in Pseudocode 2, i is a placeholder for the 2 registers used to hold the address of the current Ki and the current location in the input buffer.

In the next 64 iterations, the words w[j], w[j−2], w[j−7] and w[j−15] are loaded from their location in the stack below the space allocated for the words A-H and their updating process. The index j wraps around every 16 iterations. Our novel design takes advantage of the constant offset between the stack pointer and the location of w [j] for every group of 16 iterations; hence, no other register is used to contain the address of w[j]. Instead, one register is used to store j which is used for both calculating the offset of the w words modulo 16 and for terminating the loop around each group of 16 iterations.

Moreover, in those 64 iterations, the word w[j−15], the index of which modulo 16 is actually j+1, could be reused from the odd iteration into the following even iteration since it becomes w[j] then. This is in addition to the availability of the values A-C as mentioned previously. This further decreases the average number of load instructions per iterations compared with the classical implementation.

Additionally, the register assignment takes into consideration the possibility of leveraging the capabilities of more advanced processor features, specifically load/store double-word, i.e., 64-bit word, which is found in ARM architectures starting from ARMv5te. In order to use the load/store double-word instruction, the registers used must be two subsequent registers, one with even index and the other with the following odd index, e.g. R0, R1, and the even register cannot be R14. It is also worth noting that, if such advanced architecture is available, our implementation utilizes the preload instruction which speeds up the following respective load instruction. However, the use of preload instruction is restricted to one value per iteration in our design due to register availability constraints when this value is needed; for all other loaded values we have maximized the number of instructions between when a value is loaded and when it is actually involved in a computation. This distancing maximizes the utilization of the pipelined architecture of the ARM processor and eliminates the stalling caused by memory access if the value were to be used immediately after it is loaded.

Figure 2:
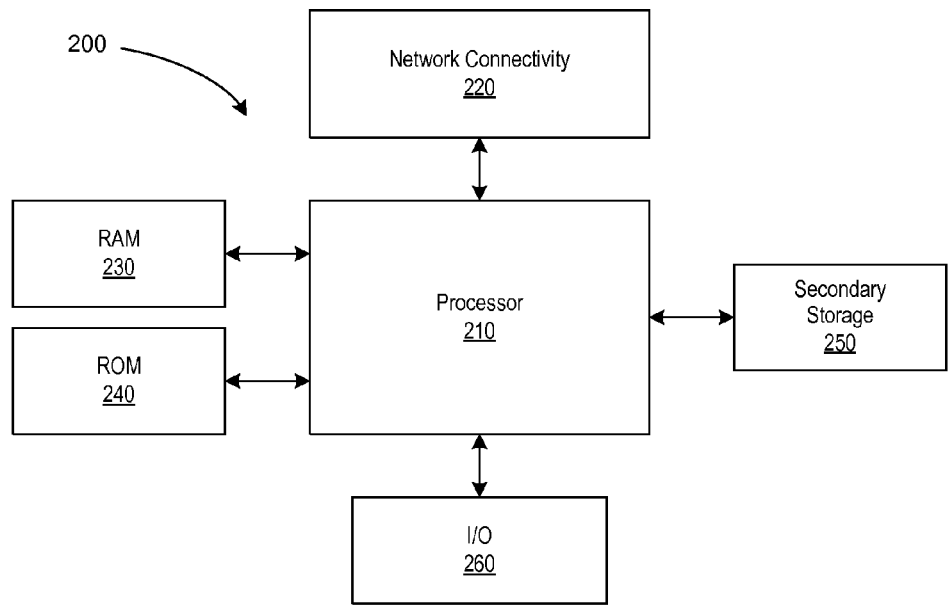
FIG. 2 depicts an exemplary system in which the present invention may be implemented.

FIG. 2 illustrates an example of a system 200 suitable for implementing one or more embodiments disclosed herein. In various embodiments, the system 200 comprises a processor 210, which may be referred to as a central processor unit (CPU) or digital signal processor (DSP), network connectivity devices 220, random access memory (RAM) 230, read only memory (ROM) 240, secondary storage 250, and input/output (I/O) devices 260. In some embodiments, the processor 210 comprises an ARM processor such as an ARM processor which conforms to the ARMv5t architecture. In some embodiments, some of these components may not be present or may be combined in various combinations with one another or with other components not shown. These components may be located in a single physical entity or in more than one physical entity. Any actions described herein as being taken by the processor 210 might be taken by the processor 210 alone or by the processor 210 in conjunction with one or more components shown or not shown in FIG. 2.

The processor 210 executes instructions, codes, computer programs, or scripts that it might access from the network connectivity devices 220, RAM 230, or ROM 240. While only one processor 210 is shown, multiple processors may be present. Thus, while instructions may be discussed as being executed by a processor 210, the instructions may be executed simultaneously, serially, or otherwise by one or multiple processors 210 implemented as one or more CPU chips.

In various embodiments, the network connectivity devices 220 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 220 may enable the processor 210 to communicate with the Internet or one or more telecommunications networks or other networks from which the processor 210 might receive information or to which the processor 210 might output information.

The network connectivity devices 220 may also be capable of transmitting or receiving data wirelessly in the form of electromagnetic waves, such as radio frequency signals or microwave frequency signals. Information transmitted or received by the network connectivity devices 220 may include data that has been processed by the processor 210 or instructions that are to be executed by processor 210. The data may be ordered according to different sequences as may be desirable for either processing or generating the data or transmitting or receiving the data.

In various embodiments, the RAM 230 may be used to store volatile data and instructions that are executed by the processor 210. The ROM 240 shown in FIG. 2 may be used to store instructions and perhaps data that are read during execution of the instructions. Access to both RAM 230 and ROM 240 is typically faster than to secondary storage 250. The secondary storage 250 is typically comprised of one or more disk drives or tape drives and may be used for non-volatile storage of data or as an over-flow data storage device if RAM 230 is not large enough to hold all working data. Secondary storage 250 may be used to store programs that are loaded into RAM 230 when such programs are selected for execution. The I/O devices 260 may include liquid crystal displays (LCDs), touch screen displays, keyboards, keypads, switches, dials, mice, track balls, voice recognizers, card readers, paper tape readers, printers, video monitors, or other well-known input/output devices.

Figure 3:
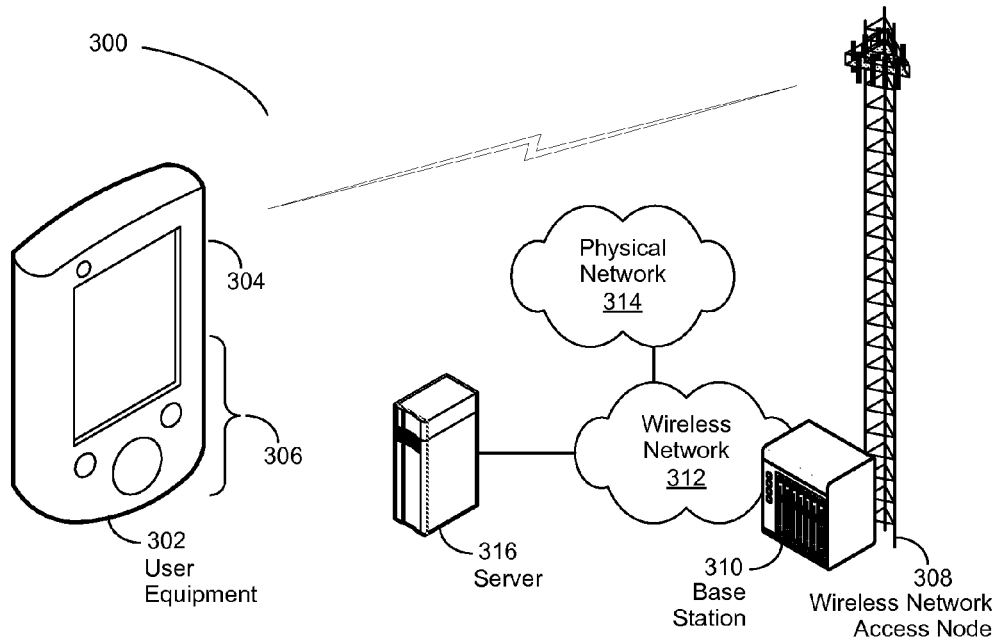
FIG. 3 shows a wireless communications system including an embodiment of a user equipment (UE).

FIG. 3 shows a wireless communications system including an embodiment of user equipment (UE) 302. Though illustrated as a mobile phone, the UE 302 may take various forms including a wireless handset, a pager, a personal digital assistant (PDA), a portable computer, a tablet computer, or a laptop computer. Many suitable devices combine some or all of these functions. In some embodiments, the UE 302 is not a general purpose computing device like a portable, laptop or tablet computer, but rather is a special-purpose communications device such as a mobile phone, a wireless handset, a pager, a PDA, or a telecommunications device installed in a vehicle. The UE 302 may likewise be a device, include a device, or be included in a device that has similar capabilities but that is not transportable, such as a desktop computer, a set-top box, or a network node. In these and other embodiments, the UE 302 may support specialized activities such as gaming, inventory control, job control, and/or task management functions, and so on.

In various embodiments, the UE 302 includes a display 304. The UE 302 likewise includes a touch-sensitive surface, a keyboard or other input keys 306 generally used for input by a user. In these and other environments, the keyboard may be a full or reduced alphanumeric keyboard such as QWERTY, Dvorak, AZERTY, and sequential keyboard types, or a traditional numeric keypad with alphabet letters associated with a telephone keypad. The input keys may likewise include a trackwheel, an exit or escape key, a trackball, and other navigational or functional keys, which may be inwardly depressed to provide further input function. The UE 302 may likewise present options for the user to select, controls for the user to actuate, and cursors or other indicators for the user to direct.

The UE 302 may further accept data entry from the user, including numbers to dial or various parameter values for configuring the operation of the UE 302. The UE 302 may further execute one or more software or firmware applications in response to user commands. These applications may configure the UE 302 to perform various customized functions in response to user interaction. Additionally, the UE 302 may be programmed or configured over-the-air (OTA), for example from a wireless base station 310, a server 316, a wireless network access node 308, or a peer UE 302.

Among the various applications executable by the UE 200 are a web browser, which enables the display 304 to display a web page. The web page may be obtained via wireless communications with a wireless network access node 308, such as a cell tower, a peer UE 302, or any other wireless communication network 312 or system. In various embodiments, the wireless network 312 is coupled to a wired network 314, such as the Internet. Via the wireless network 312 and the wired network 314, the UE 302 has access to information on various servers, such as a server 316. The server 316 may provide content that may be shown on the display 304. Alternately, the UE 302 may access the wireless network 312 through a peer UE 302 acting as an intermediary, in a relay type or hop type of connection. Skilled practitioners of the art will recognized that many such embodiments are possible and the foregoing is not intended to limit the spirit, scope, or intention of the disclosure.

Figure 4:
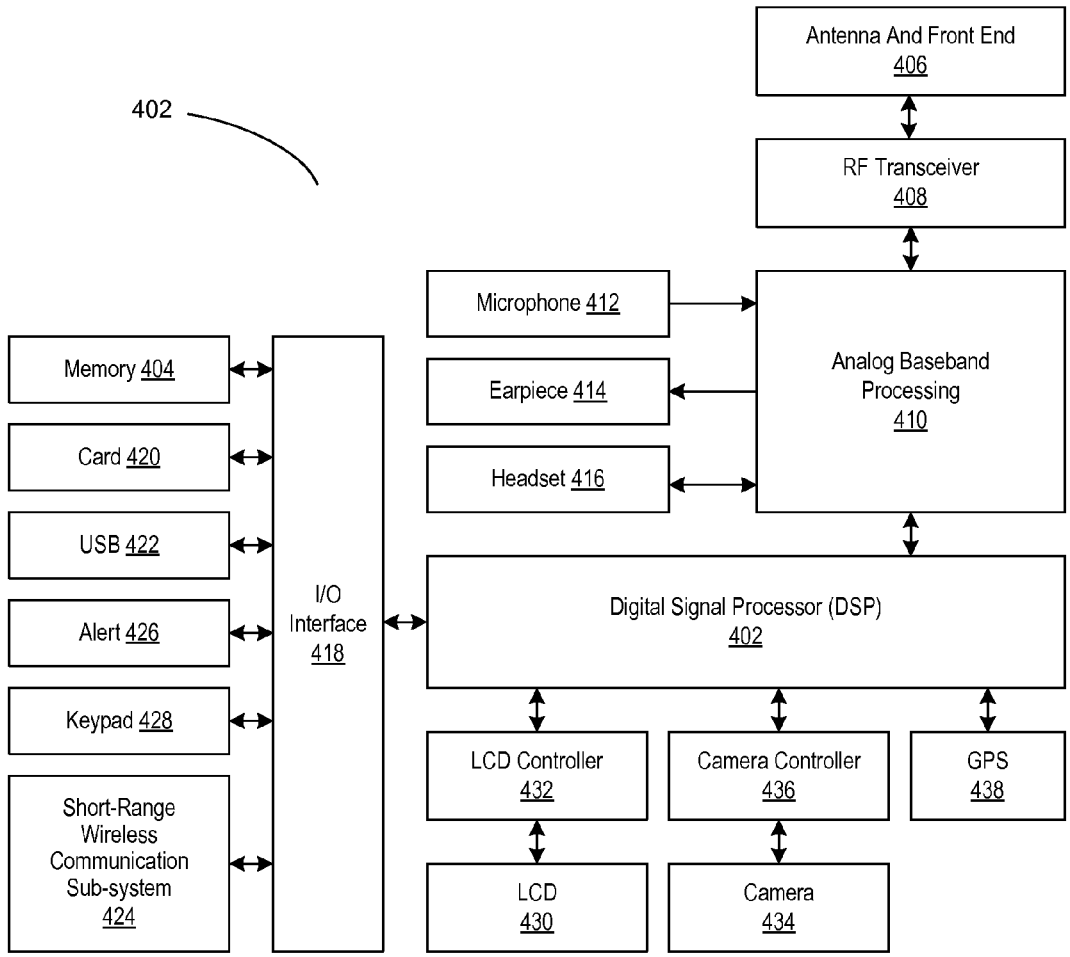
FIG. 4 is a simplified block diagram of an exemplary UE comprising a digital signal processor (DSP).

FIG. 4 depicts a block diagram of an exemplary user equipment (UE) 302 in which the present invention may be implemented. While various components of a UE 302 are depicted, various embodiments of the UE 302 may include a subset of the listed components or additional components not listed. As shown in FIG. 4, the UE 302 includes a digital signal processor (DSP) 402 and a memory 404. As shown, the UE 302 may further include an antenna and front end unit 406, a radio frequency (RF) transceiver 408, an analog baseband processing unit 410, a microphone 412, an earpiece speaker 414, a headset port 416, an input/output (I/O) interface 418, a removable memory card 420, a universal serial bus (USB) port 422, a short range wireless communication sub-system 424, an alert 426, a keypad 428, a liquid crystal display (LCD) 430, which may include a touch sensitive surface, an LCD controller 432, a charge-coupled device (CCD) camera 434, a camera controller 436, and a global positioning system (GPS) sensor 438. In various embodiments, the UE 302 may include another kind of display that does not provide a touch sensitive screen. In an embodiment, the DSP 402 may communicate directly with the memory 404 without passing through the input/output interface 418.

In various embodiments, the DSP 402 or some other form of controller or central processing unit (CPU) operates to control the various components of the UE 302 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the UE 302 to send and receive information from a cellular network or some other available wireless communications network or from a peer UE 302. In an embodiment, the antenna and front end unit 206 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 406 may include antenna tuning or impedance matching components, RF power amplifiers, or low noise amplifiers.

In various embodiments, the RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 or the DSP 402 or other central processing unit. In some embodiments, the RF Transceiver 208, portions of the Antenna and Front End 406, and the analog base band processing unit 410 may be combined in one or more processing units and/or application specific integrated circuits (ASICs).

The analog baseband processing unit 410 may provide various analog processing of inputs and outputs, for example analog processing of inputs from the microphone 412 and the headset 416 and outputs to the earpiece 414 and the headset 416. To that end, the analog baseband processing unit 410 may have ports for connecting to the built-in microphone 412 and the earpiece speaker 414 that enable the UE 302 to be used as a cell phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In various embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB interface 422 and the short range wireless communication sub-system 424. The USB interface 422 may be used to charge the UE 302 and may also enable the UE 302 to function as a peripheral device to exchange information with a personal computer or other computer system. The short range wireless communication sub-system 424 may include an infrared port, a Bluetooth interface, an IEEE 802.11 compliant wireless interface, or any other short range wireless communication sub-system, which may enable the UE 302 to communicate wirelessly with other nearby mobile devices and/or wireless base stations.

The input/output interface 418 may further connect the DSP 402 to the alert 426 that, when triggered, causes the UE 302 to provide a notice to the user, for example, by ringing, playing a melody, or vibrating. The alert 426 may serve as a mechanism for alerting the user to any of various events such as an incoming call, a new text message, and an appointment reminder by silently vibrating, or by playing a specific pre-assigned melody for a particular caller.

The keypad 428 couples to the DSP 402 via the I/O interface 418 to provide one mechanism for the user to make selections, enter information, and otherwise provide input to the UE 302. The keyboard 428 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 430, which may include touch screen capability and also display text and/or graphics to the user. The LCD controller 432 couples the DSP 402 to the LCD 430.

The CCD camera 434, if equipped, enables the UE 302 to take digital pictures. The DSP 402 communicates with the CCD camera 434 via the camera controller 436. In another embodiment, a camera operating according to a technology other than Charge Coupled Device cameras may be employed. The GPS sensor 438 is coupled to the DSP 402 to decode global positioning system signals, thereby enabling the UE 302 to determine its position. Various other peripherals may also be included to provide additional functions, such as radio and television reception.

Figure 5:
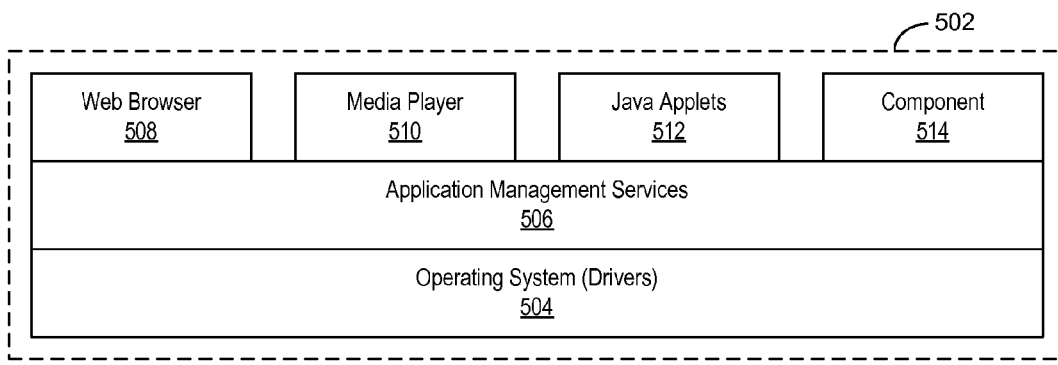
FIG. 5 is a simplified block diagram of a software environment that may be implemented by the DSP.

FIG. 5 illustrates a software environment 502 that may be implemented by the DSP 402. The DSP 402 executes operating system drivers 504 that provide a platform from which the rest of the software operates. The operating system drivers 504 provide drivers for the UE 302 hardware with standardized interfaces that are accessible to application software. The operating system drivers 504 include application management services (AMS) 506 that transfer control between applications running on the UE 302. Also shown in FIG. 5 are a web browser application 508, a media player application 510, and Java applets 512. The web browser application 508 configures the UE 302 to operate as a web browser, allowing a user to enter information into forms and select links to retrieve and view web pages. The media player application 510 configures the UE 302 to retrieve and play audio or audiovisual media. The Java applets 512 configure the UE 302 to provide games, utilities, and other functionality. A component 514 might provide functionality described herein. The UE 302, a base station 310, and other components described herein might include a processing component that is capable of executing instructions related to the actions described above.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

As used herein, the terms "user equipment" and "UE" can refer to wireless devices such as mobile telephones, personal digital assistants (PDAs), handheld or laptop computers, and similar devices or other user agents ("UAs") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the claimed subject matter.

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein. Although the present invention has been described in detail, it should be understood that various changes, substitutions and alterations can be made hereto without departing from the spirit and scope of the invention as defined by the appended claims.

What is claimed is:

1. A method for maximizing a number of registers at an end of an iteration of a hash algorithm for use in a next iteration, the method comprising:
   categorizing and unrolling iterations of an original secure hash algorithm into even iterations and odd iterations;
   reversing a sequence of computations in the even iterations to those in the odd iterations, said reversing resulting in an average number of words that need to be loaded into the registers per iteration being reduced by at least one-half compared to the original secure hash algorithm; and
   combining an even iteration and an odd iteration to provide a new iteration of a loop.

2. The method of claim 1, wherein the secure hash algorithm comprises at least one of an SHA-512 algorithm and an SHA-384 algorithm.

3. The method of claim 1, further comprising assigning state words to registers within an advanced processor architecture to leverage capabilities of the advanced processor architecture.

4. The method of claim 3, wherein the advanced processor architecture comprises ARM type processors.

5. The method of claim 3, wherein the capabilities comprise data preloading and double word loading and storing.

6. The method of claim 3, further comprising consuming state values residing in the registers at an end of an iteration at a beginning of a following iteration.

7. The method of claim 1, further comprising in a last 64 iterations of the secure hash algorithm, keeping an offset constant between a location of a current 8 state words and a pointer to a current w word.

8. The method of claim 7, wherein the current w word is one of 16 words; and,
   an input block is originally copied in a state and is constantly being updated.

9. The method of claim 1, wherein each 16 iterations of the hash algorithm are grouped together and are governed by a counter, the counter storing an index of a current w word, the counter being used to determine locations of other w words and to determine loop termination.

10. The method of claim 1, further comprising assigning registers pairs, R(d), R(d+1), to 64-bit words when loading and storing the words,
    wherein d is even and not equal to 14 so as to leverage doubleword instructions of a processor.

11. A system for maximizing a number of registers at an end of an iteration of a hash algorithm for use in a next iteration, the system comprising:
    a processing circuit configured to
    categorize and unroll iterations of an original secure hash algorithm into even iterations and odd iterations;
    reverse a sequence of computations in the even iterations to those in the odd iterations, said reversing resulting in an average number of words that need to be loaded into the registers per iteration being reduced by at least one-half compared to the original secure hash algorithm; and
    combine an even iteration and an odd iteration to provide a new iteration of a loop.

12. The system of claim 11, wherein the secure hash algorithm comprises at least one of an SHA-512 algorithm and an SHA-384 algorithm.

13. The system of claim 11, wherein the processing circuit is further configured to assign state words to registers within an advanced processor architecture to leverage capabilities of the advanced processor architecture.

14. The system of claim 13, wherein the advanced processor architecture comprises ARM type processors.

15. The system of claim 13, wherein the capabilities comprise data preloading and doubleword loading and storing.

16. The system of claim 13, wherein the processing circuit is further configured to consume state values residing in the registers at an end of an iteration at a beginning of a following iteration.

17. The system of claim 11, wherein the processing circuit is further configured to in a last 64 iterations of the secure hash algorithm, keep an offset constant between a location of a current 8 state words and a pointer to a current w word.

18. The system of claim 17, wherein the current w word is one of 16 words; and,
    an input block is originally copied in a state and is constantly being updated.

19. The system of claim 11, wherein each 16 iterations of the hash algorithm are grouped together and are governed by a counter, the counter storing an index of a current w word, the counter being used to determine locations of other w words and to determine loop termination.

20. The system of claim 11,
    wherein the processing circuit is further configured to assign registers pairs, R(d), R(d+1), to 64-bit words when loading and storing the words,
    wherein d is even and not equal to 14 so as to leverage doubleword instructions of the processor.

21. A method for maximizing a number of registers at an end of an iteration of a hash algorithm for use in a next iteration, the method comprising:
    categorizing and unrolling secure hash algorithm iterations into even iterations and odd iterations;

reversing, by a processing circuit, a sequence of computations in the even iterations to those in the odd iterations;
combining an even iteration and an odd iteration to provide a new iteration of a loop; and in a last 64 iterations of the secure hash algorithm, keeping an offset constant between a location of a current 8 state words and a pointer to a current w word.

\* \* \* \* \*